United States Patent
Cheung et al.

(10) Patent No.: US 7,151,620 B2
(45) Date of Patent: Dec. 19, 2006

(54) UTILITY DOCUMENT LID FOR IMAGING DEVICES

(75) Inventors: Nigel M-F Cheung, Fort Collins, CO (US); Michael A. Tregoning, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 918 days.

(21) Appl. No.: 10/012,914

(22) Filed: Oct. 22, 2001

(65) Prior Publication Data

US 2003/0076549 A1    Apr. 24, 2003

(51) Int. Cl.
*H04N 1/04* (2006.01)

(52) U.S. Cl. .............. 358/474; 358/505; 358/494; 399/377; 361/680

(58) Field of Classification Search ............... 358/474, 358/505, 497, 496, 494; 399/377; 361/680
See application file for complete search history.

(56) References Cited

U.S. PATENT DOCUMENTS

| | | | | |
|---|---|---|---|---|
| 3,588,106 A * | 6/1971 | Csaba et al. | ............... | 271/170 |
| 4,733,310 A * | 3/1988 | Kapp et al. | ................. | 358/300 |
| 4,812,874 A * | 3/1989 | Kubota et al. | ............. | 399/185 |
| 4,900,005 A * | 2/1990 | Blyth et al. | ................. | 271/127 |
| 5,548,411 A * | 8/1996 | Sato et al. | .................. | 358/400 |
| 5,842,692 A * | 12/1998 | Rutishauser | ............... | 271/3.2 |
| 6,005,545 A * | 12/1999 | Nishida et al. | ............ | 345/603 |
| 6,055,070 A * | 4/2000 | Kang | ......................... | 358/497 |
| 6,057,936 A * | 5/2000 | Obara et al. | ................ | 358/296 |
| 6,661,543 B1 * | 12/2003 | Morita | ....................... | 358/498 |

FOREIGN PATENT DOCUMENTS

| EP | 0868067 | * | 9/1998 |
|---|---|---|---|
| EP | 0868067 A2 | | 9/1998 |

* cited by examiner

*Primary Examiner*—Douglas Q. Tran
*Assistant Examiner*—Negussie Worku

(57) ABSTRACT

A lid for an imaging device is disclosed. The lid comprises a cover having a first side and a second side. The first side of the cover is adapted to retain an object to be imaged proximate to an imaging plate of the imaging device. At least one storage compartment is disposed on the second side of the cover.

16 Claims, 3 Drawing Sheets

UTILITY DOCUMENT LID FOR IMAGING DEVICES

TECHNICAL FIELD OF THE INVENTION

The present invention relates generally to the field of imaging devices, and more particularly to a utility document lid for such imaging devices.

BACKGROUND OF THE INVENTION

Imaging devices, including, but not limited to, optical flatbed scanners, are typically used to obtain a digital image of an object, such as a magazine article, photograph or other type of document. Flatbed scanners generally include an imaging plate and a document lid. The imaging plate is typically a transparent platen upon which the object to be scanned is placed and the document lid is used to cover the imaging plate and the object. The document lid generally includes a document reflector which presses the document to be imaged flat against the imaging plate to provide a better image.

Imaging devices, such as flatbed scanners, are generally placed in close proximity to other electronic equipment to facilitate using the imaging device. For example, the imaging device may be coupled to a computer or other processing device to allow manipulation of a scanned image. Furthermore, a printer or other output device may be located in close proximity to the imaging device so that the scanned image may be output to a user of the imaging device. Other devices, such as a telephone, speakers, keyboard and mouse may also be present in close proximity to the imaging device. Thus, the workspace surrounding the imaging device may be limited. Accordingly, using the imaging device and performing other tasks near the imaging device may become increasingly difficult.

SUMMARY OF THE INVENTION

In accordance with an embodiment of the present invention, a lid for an imaging device is disclosed. The lid comprises a cover having a first side and a second side. The first side of the cover is adapted to retain an object to be imaged proximate to an imaging plate of the imaging device. At least one storage compartment is disposed on the second side of the cover.

In accordance with another embodiment of the present invention, an imaging device comprises a housing and an imaging plate coupled to the housing. The imaging plate is adapted to receive an object to be imaged. The imaging device also comprises a cover coupled to the housing. The cover has a first side and a second side. The first side is adapted to retain the object proximate to the imaging plate. A storage compartment is disposed on the second side of the cover.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Embodiments of the present invention and the advantages thereof are best understood by referring to FIGS. 1 through 4 of the drawings, like numerals being used for like and corresponding parts of the various drawings.

Figure 1A:
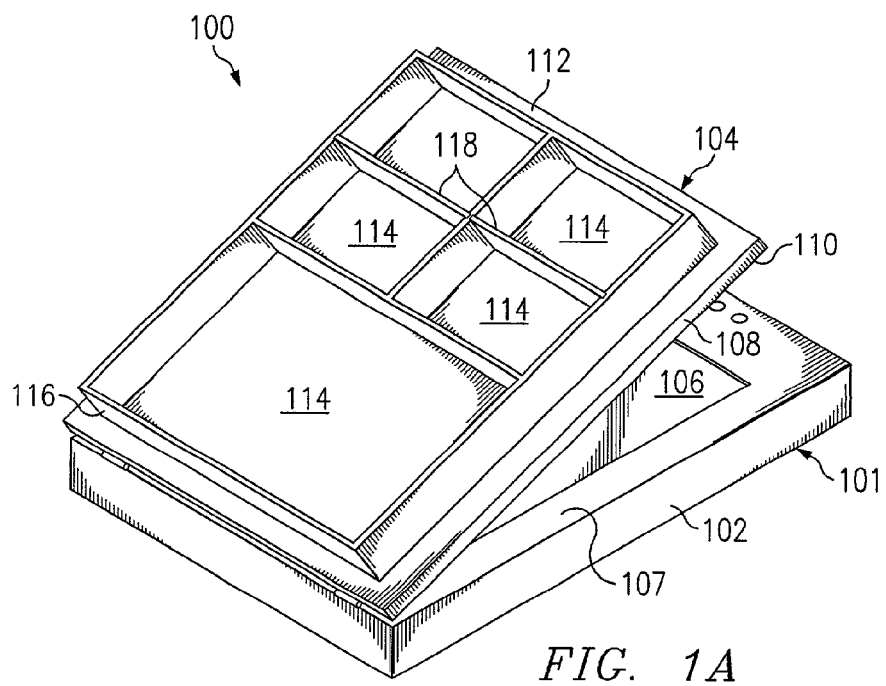
FIG. 1A is an isometric view of an imaging device in accordance with an embodiment of the present invention.
Figure 1B:
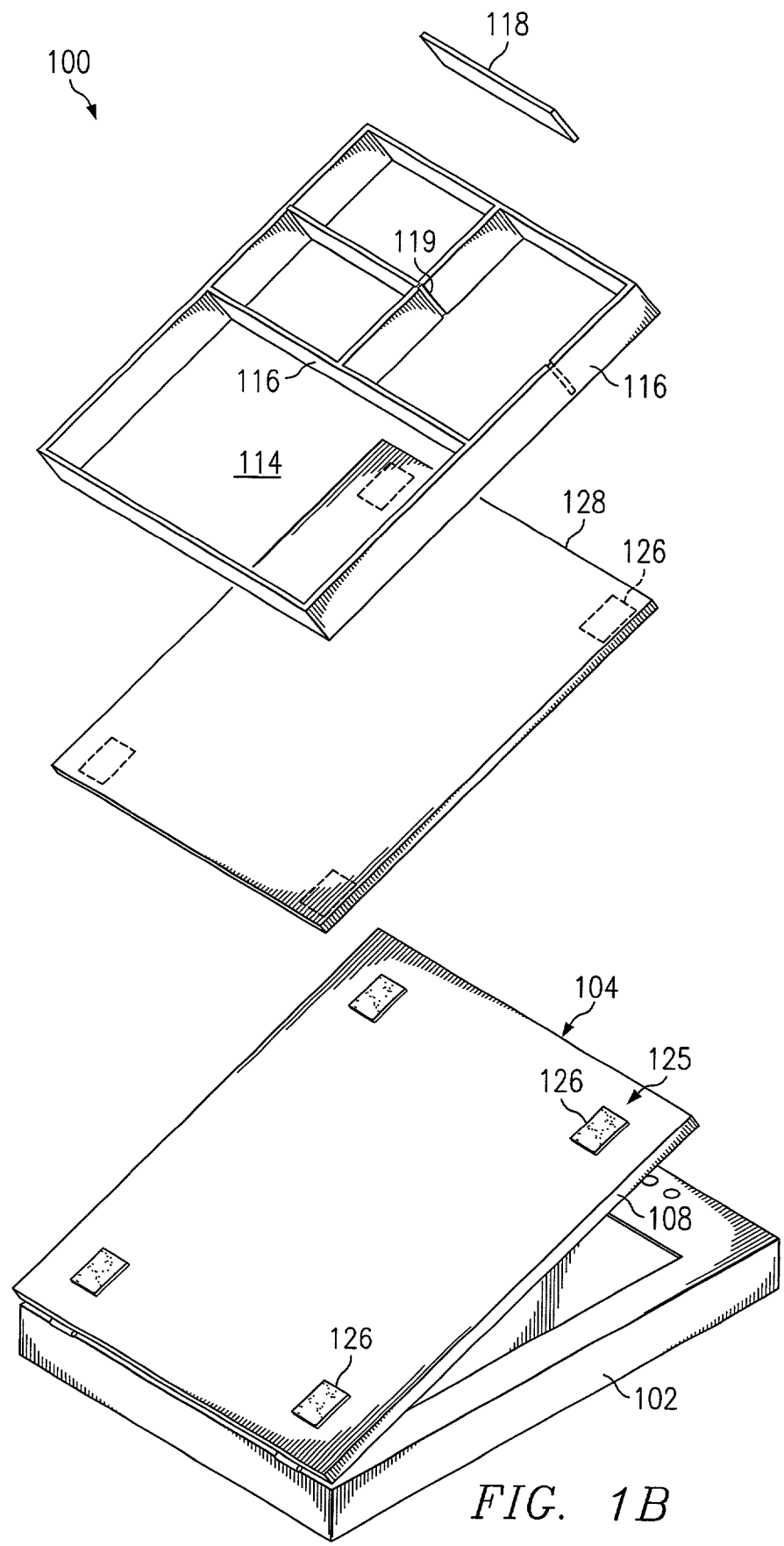
FIG. 1B is an exploded view of the imaging device of FIG. 1A.

FIG. 1A is an isometric view of an imaging device 100 in accordance with an embodiment of the present invention and FIG. 1B is an exploded view of imaging device 100 of FIG. 1A. In the illustrated embodiment, imaging device 100 comprises a flatbed scanner 101; however, imaging device 101 may also comprise other types of devices, such as, but not limited to, photocopiers, facsimile machines, printers, etcetera.

Scanner 101 comprises a housing 102 and a document lid 104 coupled to housing 102. Housing 102 comprises an imaging plate 106 disposed proximate to a top surface 107 of housing 102. An object to be imaged, for example an item, a document, a photograph, a negative, a transparency, and/or the like (not explicitly shown), may be placed on imaging plate 106. Document lid 104 is used to cover imaging plate 106 and the object placed thereon. Document lid 104 comprises a document cover 108 and a document reflector (not explicitly shown). Document cover 108 includes a downwardly disposed side 110 facing imaging plate 106 and an upwardly disposed side 112 facing away from imaging plate 106. The document reflector presses the object to be imaged against imaging plate 106 to provide a better image.

In the illustrated embodiment of the present invention, document lid 104 also comprises one or more storage compartments 114 disposed on side 112 of document cover 108. Each of the storage compartments 114 may be used to store a variety of items, such as, but not limited to, stationary, accessories, scissors, pens, knives, rulers, pencils, clips, staplers, transparency adapters, templates and/or the like. In the illustrated embodiment of FIG. 1A, each of the storage compartments 114 is defined by walls 116 integrally formed on side 112 of document cover 108. The height of the walls 116 may be adapted or modified to obtain a desired depth of storage compartments 114. Although, storage compartments 114 are shown as rectangular in FIG. 1A, the invention is not so limited and storage compartments 114 may be formed having any desired shape to accommodate the items to be stored in the storage compartments. For example, one or more of storage compartments 114 may be circular in shape to store circular items.

Walls 116 of storage compartments 114 may also be constructed so that the storage compartments 114 have different sizes to accommodate storage of different types or sizes of items. One or more removable dividers 118 may be used to reduce or expand the size of one or more of storage compartments 114 depending on the items to be stored. Walls 116 may be adapted to receive removable dividers 118. For example, as best illustrated in FIG. 1B, the walls 116 may be constructed having slots 119 into which removable dividers 118 may be inserted or removed to reduce or expand compartments 114. Walls 116 and/or dividers 118 may be constructed from transparent or translucent materials to permit viewing of the contents of the different storage compartments.

As best illustrated in FIG. 1B, instead of being integrally formed on side 112 of document cover 108, walls 116 may be removably coupled to a support member 128. Support member 128 may in turn be removably coupled to side 112 by one or more coupling elements 125. Coupling elements 125 may comprise hook-and-loop elements 126 or other types of coupling devices to accommodate coupling and removal of support member 128 from side 112 of document cover 108. Walls 116 may also be directly coupled to side 112 of document cover 108. Additionally, the walls 116 and/or support member 128 may be configured to be permanently coupled to cover 108.

Coupling elements 126 may be selected from one or more of the following—hook-and-loop segments, sticking pads, screws, nuts and bolts, fasteners, snaps, slide bars, and/or the like. When a slide bar is used as a coupling element, the slide bar may fit into a groove (not shown) on document cover 108 or a slide bar on document cover 108 may fit into a groove of support member 128. Although in the illustrated embodiment, four coupling elements 126 are shown, the invention is not so limited and if desired fewer or greater number of coupling elements may be used.

Figure 2:
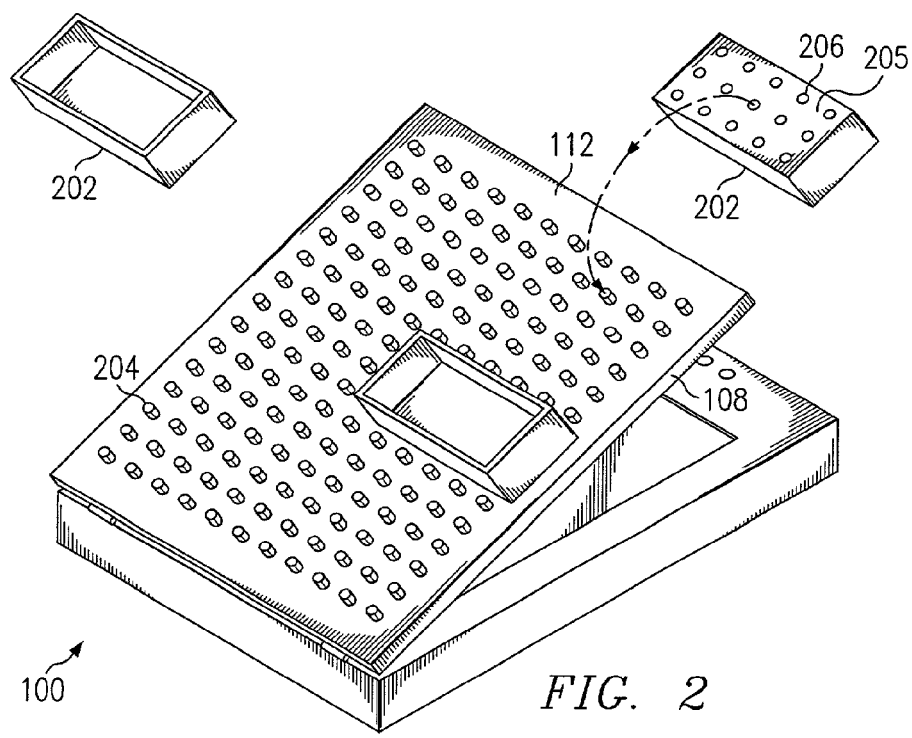
FIG. 2 is an isometric view of an imaging device in accordance with another embodiment of the present invention.

FIG. 2 is an isometric view of imaging device 100 in accordance with another embodiment of the present invention. In the embodiment illustrated in FIG. 2, compartments 114 comprise one or more discrete storage boxes 202 removably coupled to side 112 of document cover 108. Although, storage boxes 202 illustrated in FIG. 2 are rectangular in shape, the invention is not so limited and storage boxes 202 may be any desired shape to accommodate the items to be stored in the storage boxes 202. Storage boxes 202 may also be of different sizes to accommodate storage of different sizes and/or types of items. Storage boxes 202 may also be constructed from transparent or translucent materials to permit viewing of the contents contained within the storage boxes 202.

In the illustrated embodiment, storage boxes 202 are coupled to side 112 of document cover 108 via a plurality of protrusions 204 formed on the side 112 of the cover 108. Each of the storage boxes 202 includes one or more holes 206 in its base 205 to cooperate with protrusions 204. Alternatively, the protrusions 204 may be disposed on storage box 202 instead of on the cover 108 and the holes 206 may be correspondingly disposed on the document cover 108. The protrusion-hole coupling method of FIG. 2 enables storage boxes 202 to be positioned as desired on document cover 108. If desired, other types of methods and devices, such as those discussed herein with reference to FIG. 1B, may be used to removably couple storage boxes 202 to document cover 108. Additionally, for example, the protrusion-hole coupling method illustrated in FIG. 2 may also be used to removably couple the walls 116 and/or member 128 to the cover 108.

Figure 3:
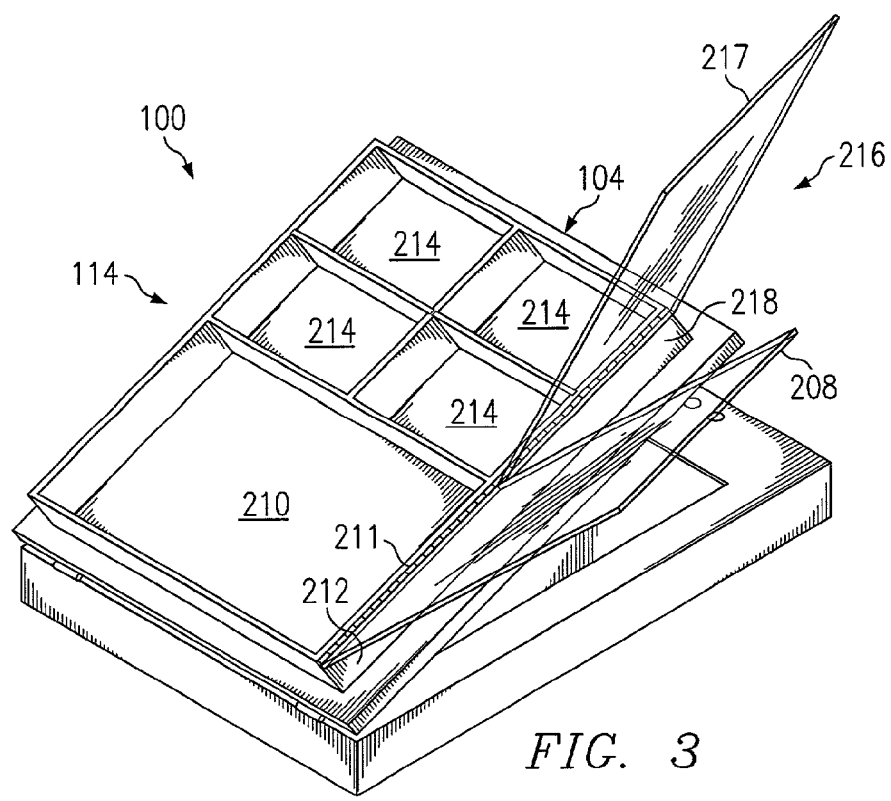
FIG. 3 is an isometric view of an imaging device in accordance with another embodiment of the present invention.

FIG. 3 is an isometric view of imaging device 100 in accordance with another embodiment of the present invention. As shown in FIG. 3, the storage compartments 114 may be provided with one or more compartment covers 216. Thus, for example, when document lid 104 is lifted, the contents contained within the storage compartments 114 are retained within the storage compartments 114 by the covers 216. If desired, one or more of the storage compartments 114 may be magnetized to retain metal objects. The compartment covers 216 may be constructed from transparent or translucent materials, thereby allowing a user to view the contents of the storage compartments 114 without removing the compartment covers 216.

Each storage compartment 114 may have its own compartment cover 216 or a plurality of storage compartments 114 may share the same compartment cover 216. For example, as shown in FIG. 3, a storage compartment 210 has its own cover 208. As illustrated, cover 208 is rotatably coupled to storage compartment 210 via a hinge 211 located along side 212 of storage compartment 210 so that it may be rotated or flipped open. Thus, a user may open compartment cover 208 to access the contents of, or to add items to, storage compartment 210.

On the other hand, as illustrated, storage compartments 214 share a single compartment cover 217 rotatably coupled to the storage compartments via hinge 211 located along side 218. Thus, for example, if a user desires to access storage compartments 214, the user may open compartment cover 217 to access all of the associated compartments 214. If desired, a compartment cover may only partially enclose a compartment.

Figure 4:
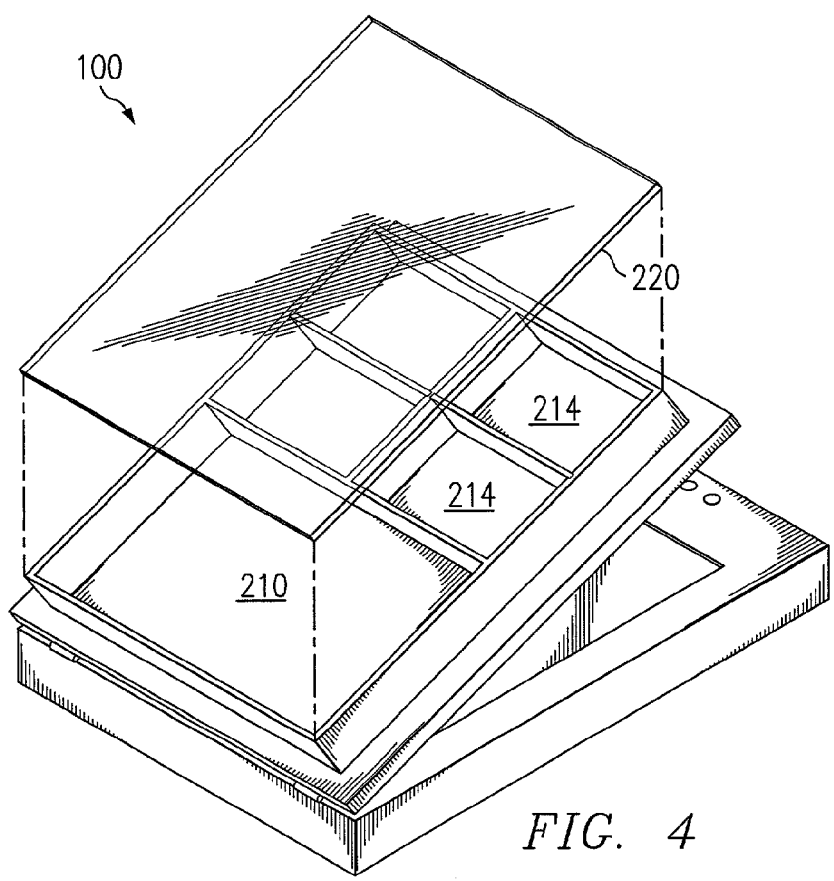
FIG. 4 is an isometric view of an imaging device in accordance with another embodiment of the present invention.

FIG. 4 is an isometric view of imaging device 100 in accordance with another embodiment of the present invention. In this embodiment, a single compartment cover 220 is used to cover all the storage compartments 210 and 214. If desired, compartment cover 220 may be constructed to be completely removable from the storage compartments 210 and 214. Hinges such as those shown in FIG. 3 or other devices, may be used for some storage compartments 114 while compartment covers 216 that are separate from the storage compartments 114 may be used for other storage compartments 114.

Thus, the present invention provides greater workspace flexibility by providing storage compartments 114 permanently or removably coupled to the imaging device 100, thereby allowing other areas of the workspace to be used for other purposes. For example, items such as stationary and/or accessories may be stored in the compartments 114 close to the area where they are more likely to be used. Additionally, the compartments 114 may be constructed as discrete components attachable to existing imaging devices 100, thereby providing retrofit capabilities to existing imaging devices 100.

What is claimed is:

1. A lid for an imaging device, the lid comprising:
   a cover having a first side and a second side, the first side adapted to retain an object to be imaged proximate to an imaging plate of the imaging device;
   at least one storage compartment disposed on the second side of the cover, wherein at least one of said at least one storage compartment is removably coupled to the cover; and
   at least one compartment cover configured to enclose the at least one storage compartment.

2. The lid of claim 1, wherein at least one of said at least one storage compartment is integrally formed on the cover.

3. The lid of claim 1, wherein a selected plurality of said at least one storage compartment are covered by a single compartment cover.

4. The lid of claim 1, wherein each of said at least one storage compartment is covered by a different compartment cover of said at least one compartment cover.

5. The lid of claim 1, further comprising a support member coupled to the second side of the cover, said at least one storage compartment disposed on the support member.

6. The lid of claim 1, wherein said at least one storage compartment comprises at least one storage box removably coupled to the second side of the cover.

7. The lid of claim 6, said at least one storage box adapted to cooperate with at least one protrusion on the second side of the cover to removably couple said at least one storage box to the second side.

8. A lid for an imaging device, the lid comprising:
a cover having a first side and a second side, the first side adapted to retain an object to be imaged proximate to an imaging plate of the imaging device;
at least one storage compartment disposed on the second side of the cover, wherein each of said at least one storage compartment comprises a plurality of walls, the lid further comprising a divider adapted to cooperate with the walls to modify a size of at least one of said at least one storage compartment; and
at least one compartment cover configured to enclose the at least one storage compartment.

9. An accessory for an imaging device, the accessory comprising:
a support member; and
at least one storage compartment disposed on the support member, the support member operable to removably couple to a cover of an imaging device.

10. The accessory of claim 9, wherein said at least one storage compartment comprises at least one storage box removably coupled to the support member.

11. An imaging device, comprising:
a housing;
an imaging plate coupled to the housing and adapted to receive an object to be imaged;
a cover coupled to the housing, the cover having a first side and a second side, the first side adapted to retain the object proximate to the imaging plate;
a storage compartment disposed on the second side of the cover, wherein the storage compartment comprises a plurality of integrally formed walls on the cover; and
a compartment cover configured to enclose the storage compartment.

12. The imaging device of claim 11, wherein the compartment cover is transparent.

13. The imaging device of claim 11, wherein a plurality of walls of the storage compartment are transparent.

14. An imaging device, comprising:
a housing;
an imaging plate coupled to the housing and adapted to receive an object to be imaged;
a cover coupled to the housing, the cover having a first side and a second side, the first side adapted to retain the object proximate to the imaging plate;
a storage compartment disposed on the second side of the cover, wherein the storage compartment comprises a plurality of walls removably coupled to the cover; and
a compartment cover configured to enclose the storage compartment.

15. The imaging device of claim 14, further comprising a support member coupled to the second side of the cover, wherein the storage compartment is disposed on the support member.

16. An imaging device, comprising:
a housing;
an imaging plate coupled to the housing and adapted to receive an object to be imaged;
a cover coupled to the housing, the cover having a first side and a second side, the first side adapted to retain the object proximate to the imaging plate;
a storage compartment disposed on the second side of the cover, wherein the storage compartment comprises a plurality of walls, the imaging device further comprising a divider adapted to cooperate with the walls to modify a size of the storage compartment; and
a compartment cover configured to enclose the storage compartment.

\* \* \* \* \*

UNITED STATES PATENT AND TRADEMARK OFFICE
CERTIFICATE OF CORRECTION

PATENT NO.      : 7,151,620 B2                                                Page 1 of 1
APPLICATION NO. : 10/012914
DATED           : December 19, 2006
INVENTOR(S)     : Nigel M-F Cheung et al.

It is certified that error appears in the above-identified patent and that said Letters Patent is hereby corrected as shown below:

On the title page, item (56), under "U.S. Patent Documents", in column 1, line 1, below "3,588,106 A*    6/1971    Csaba et al. ........ 271/170"
insert -- 3,749,491* 7/1973    Maxfield et al. ....... 355/106 --.

Signed and Sealed this

Twenty-eighth Day of April, 2009

JOHN DOLL
*Acting Director of the United States Patent and Trademark Office*